United States Patent
Hui

(10) Patent No.: US 9,802,510 B1
(45) Date of Patent: Oct. 31, 2017

(54) WHEELCHAIR

(71) Applicant: Kam Wah Hui, Hong Kong (HK)

(72) Inventor: Kam Wah Hui, Hong Kong (HK)

( * ) Notice: Subject to any disclaimer, the term of this patent is extended or adjusted under 35 U.S.C. 154(b) by 0 days.

(21) Appl. No.: 15/204,987

(22) Filed: Jul. 7, 2016

(30) Foreign Application Priority Data

May 4, 2016 (CN) .......................... 2016 1 0288816

(51) Int. Cl.
*A61G 5/04* (2013.01)
*B60L 15/20* (2006.01)

(52) U.S. Cl.
CPC ............ *B60L 15/2054* (2013.01); *A61G 5/04* (2013.01)

(58) Field of Classification Search
CPC ............................. B60L 15/2054; A61G 5/04
USPC ....................................................... 180/65.6
See application file for complete search history.

(56) References Cited

U.S. PATENT DOCUMENTS

| | | | | |
|---|---|---|---|---|
| 2,993,550 A * | 7/1961 | Klappert | ................ | A61G 5/047 180/15 |
| 3,142,202 A * | 7/1964 | Muhlbeyer | ............. | D06F 37/36 192/104 R |
| 3,664,450 A * | 5/1972 | Udden | .................... | A61G 5/045 180/65.1 |
| 4,281,734 A * | 8/1981 | Johnston | .................... | A61F 4/00 180/167 |
| 4,549,624 A * | 10/1985 | Doman | ..................... | A61G 5/04 180/6.28 |
| 5,094,310 A * | 3/1992 | Richey | .................... | A61G 5/045 180/6.5 |
| 5,139,279 A * | 8/1992 | Roberts | .................. | B62D 7/142 180/409 |
| 5,253,724 A * | 10/1993 | Prior | ....................... | A61G 5/045 180/6.5 |
| 5,445,572 A * | 8/1995 | Parker | ....................... | A61G 5/04 475/182 |
| 5,474,315 A * | 12/1995 | Klas | ........................ | A01D 34/68 180/349 |
| 5,476,424 A * | 12/1995 | Fujii | .................... | B60L 11/1807 180/65.8 |
| 5,482,125 A * | 1/1996 | Pagett | ..................... | A61G 5/042 180/6.32 |
| 5,680,908 A * | 10/1997 | Reed | ........................ | B60K 1/00 180/165 |
| 5,704,440 A * | 1/1998 | Urban | .................... | B60L 11/123 180/65.23 |
| 5,727,644 A * | 3/1998 | Roberts | .................. | B62D 7/026 180/409 |

(Continued)

*Primary Examiner* — James A Shriver, II
*Assistant Examiner* — Brian L Cassidy

(57) ABSTRACT

The present invention relates to a wheelchair, comprising a wheelchair body, a control system, two front wheels and two rear wheels mounted to the front part and rear part of the wheelchair body respectively. The wheelchair further comprises a left and right transmission gear and a front and rear transmission gear mounted to the front part and rear part of the wheelchair body and connected to the two front wheels, the two rear wheels and the control system respectively. The left and right transmission gear is used to drive the two front wheels to rotate left and right and the front and rear transmission gear is used to drive the two rear wheels to move forward and backward and assist left and right rotation. The present invention enables the wheelchair to turn left or right while moving forward or backward on two parallel lines, allowing convenience of use.

13 Claims, 4 Drawing Sheets

(56) References Cited

U.S. PATENT DOCUMENTS

| | | | | |
|---|---|---|---|---|
| 5,752,710 A | * | 5/1998 | Roberts | A61G 5/046 180/234 |
| 5,813,488 A | * | 9/1998 | Weiss | B60K 7/0007 180/65.1 |
| 5,921,338 A | * | 7/1999 | Edmondson | B60G 21/045 180/6.5 |
| 6,125,963 A | * | 10/2000 | Staiger | B62D 7/09 180/408 |
| 6,244,405 B1 | * | 6/2001 | Chen | B60B 27/0005 192/64 |
| 6,408,961 B1 | * | 6/2002 | Chen | A61G 5/02 180/6.5 |
| 6,524,217 B1 | * | 2/2003 | Murakami | B60K 6/365 180/65.225 |
| 6,547,018 B1 | * | 4/2003 | Choi | A61G 5/045 180/11 |
| 6,684,969 B1 | * | 2/2004 | Flowers | A61G 5/042 180/316 |
| 6,807,465 B2 | * | 10/2004 | Ulrich | A61G 5/045 180/65.1 |
| 7,658,391 B1 | * | 2/2010 | Wurm | B60B 37/06 280/80.1 |
| 7,866,432 B2 | * | 1/2011 | Xie | B62D 11/24 180/252 |
| 8,312,957 B1 | * | 11/2012 | Stoltzfus | B62D 7/1509 180/408 |
| 8,413,756 B2 | * | 4/2013 | Kempf | B60K 17/342 180/251 |
| 8,464,843 B2 | * | 6/2013 | Qiu | B60B 33/0007 188/1.12 |
| 9,108,462 B1 | * | 8/2015 | Stone | B60B 33/0023 |
| 9,235,210 B2 | * | 1/2016 | Zhang | G09F 13/16 |
| 9,302,544 B2 | * | 4/2016 | Jie | B60B 33/0042 |
| 2003/0029655 A1 | * | 2/2003 | Lo | B60K 7/0007 180/65.6 |
| 2011/0313604 A1 | * | 12/2011 | Kume | B62B 3/001 701/22 |
| 2014/0284130 A1 | * | 9/2014 | Knoblauch | B60K 1/02 180/242 |
| 2014/0332301 A1 | * | 11/2014 | Knoblauch | B60K 1/00 180/248 |

\* cited by examiner

WHEELCHAIR

TECHNICAL FIELD OF THE INVENTION

The present invention relates to a wheelchair, and more particularly to an electric wheelchair.

BACKGROUND OF THE INVENTION

Currently, there are numerous kinds of electric wheelchairs in the market, but in most of them, two motors driving front and rear wheels are disposed on the main shaft of the rear wheels. The two motors are coupled with threads and exposed. They are liable to damage, wetting and open circuit. Further, the batteries need to supply power to two motors, so the power consumption is large and the volume of the batteries is big, resulting in increase of the weight and volume, and an undesirable appearance of the wheelchair. In case the circuit of the wheelchair is faulty or fittings need to be replaced, the electronic board is not easily repaired and repair cost is high, unable to meet people's use requirements.

SUMMARY OF THE INVENTION

The object of the present invention is to overcome the defects of the abovementioned technology and provide a user-friendly easily repaired electric wheelchair with a different driving structure and low maintenance cost.

The object of the present invention is realized in the following way:
a wheelchair, comprising:
a wheelchair body;
a control system;
two front wheels and two rear wheels mounted to a front part and a rear part of the wheelchair body respectively;
wherein the wheelchair further comprises a left and right transmission gear used to drive the two front wheels to rotate left and right, and a front and rear transmission gear used to drive the two rear wheels to move forward and backward and assist left and right rotation which are mounted to the front part and the rear part of the wheelchair body respectively and connected to the two front wheels, the two rear wheels and the control system respectively.

Further, the left and right transmission gear comprises a first motor, a left and right movement member connected to the first motor which is connected to the control system, and two first chains mounted on spindles of the two front wheels, which are all mounted into a front end of the wheelchair body;
wherein one end of each of the two first chains is mutually connected through a first metal wire, while the other end of each of the two first chains is connected to two ends of the left and right movement member through a second metal wire;
and wherein the first motor drives the left and right movement member to move left and right when it rotates, then the left and right movement member drives the two first chains on spindles of the wheels to move left and right by the first metal wire and the second metal wire and the two first chains drive the two front wheels to rotate left and right.

Further, the front and rear transmission gear comprises a second motor, a drive gear, a driven gear and a main bearing, which are all mounted into a rear end of the wheelchair body;
wherein the second motor is connected to the control system and the drive gear that is connected to the driven gear through second chains respectively, and the main bearing is mounted on the driven gear; and wherein the second motor drives the drive gear to rotate when it rotates, then the drive gear drives the driven gear to rotate by the second chains, and the driven gear drives the main bearing to rotate, while the main bearing drives two rear wheels to move forward and backward and assists left and right rotation.

Further, the main bearing has a threaded end at one end which is mounted into a bearing hole of one rear wheel and connected to the bearing hole in a threaded manner, and a smooth end at the other end which is mounted into a bearing hole of the other rear wheel and rotating freely in the bearing hole; wherein the main bearing drives the rear wheel on its threaded end to move forward and backward and assists left and right rotation when it rotates, while the rear wheel on its smooth end follows the rear wheel on the threaded end to move.

Further, the spindle of each of the two front wheels is disposed in a housing in a freely rotatable manner, in which the housing is connected to a bracket mounted on front end of the wheelchair body; wherein the lower end of the spindle of each of the two front wheels is connected to an inverted U-shaped structure, in which the inverted U-shaped structure is rotatable left and right relative to the spindle, and left and right ends of the front wheel are mounted on the U-shaped structure and rotatable on the U-shaped structure.

Further, the lower end of the spindle of each of the two front wheels is connected to an inverted U-shaped structure through a chain wheel in which the first chains is disposed in a sleeved manner, so that the first chains are configured to drive the inverted U-shaped structures to rotate left and right when they move left and right, by which two front wheels are driven to rotate left and right.

Further, the control system comprises a master controller, a main circuit, a left and right transmission gear circuit and a front and rear transmission gear circuit, in which the master controller, the left and right transmission gear circuit and the front and rear transmission gear circuit are all connected to the main circuit and the front and rear transmission gear circuit is connected to the master controller.

Further, the control system is a speed governor mounted on a handrail on one side of the wheelchair body.

Further, the left and right transmission gear further comprises a reduction gearbox mounted into the front end of the wheelchair body and connected to the first motor.

Further, the left and right movement member is a block.

Further, at least one ball groove in which a plurality of rows of balls is positioned and an oil storage groove for storing and releasing lubricating oil in which lubricating oil for lubricating balls is stored are disposed at bottom of the block; wherein the balls partially are extruded above bottom surface of the block and are contacted with a bottom plate of the wheelchair body so that they can move smoothly on the bottom plate of the wheelchair body; and wherein the oil storage groove is positioned correspondingly to movement locus of the balls.

Further, two rows of balls are positioned in the ball groove.

Compared with prior art, the left and right transmission gear and the front and rear transmission gear provided by the present invention are mounted to the front part and rear part of the wheelchair body respectively and not exposed, which renders that the wheel chair of the invention has a long-time service life. The left and right transmission gear drives the two front wheels to rotate left and right, and the front and rear transmission gear drives the two rear wheels to move forward and backward and assists left and right rotation so that the wheelchair can turn left or right while it moves forward and backward on two parallel lines, thereby making breakthrough in the mechanical principle of existing wheelchairs, which cannot make a turn while moving forward and backward on two parallel lines, and making the operation of the wheelchair more convenient. The present invention features a simple and compact structure, easy operation, convenient use, easy repair and replacement of fittings and low maintenance cost, tallies with economic benefit and use value and greatly meets market demand.

where: 1, wheelchair body; 2, front wheel; 3, rear wheel; 4, spindle; 5, pedal; 6, bracket; 7, speed governor; 8, direction controller; 9, left handrail; 10, right handrail; 11, frame; 12, rail; 13, backrest; 14, first motor; 15, left and right movement member; 16a and 16b, first chains; 17a, first metal wire; 17b, second metal wire; 18, inverted U-shaped structure; 19, chain wheel; 20, second motor; 21, drive gear; 22, driven gear; 23, main bearing; 24, threaded end; 25, smooth end; 26, main circuit; 27, left and right transmission gear circuit; 28, front and rear transmission gear circuit; 29, master controller; 30, ball groove; 31, oil storage groove; 32, ball; 33, audible caution light; 34, housing; 35, second chains; 36, brake.

DETAILED DESCRIPTION OF THE INVENTION

Below the present invention will be further described by referring to the accompanying drawings and embodiments.

Figure 1:
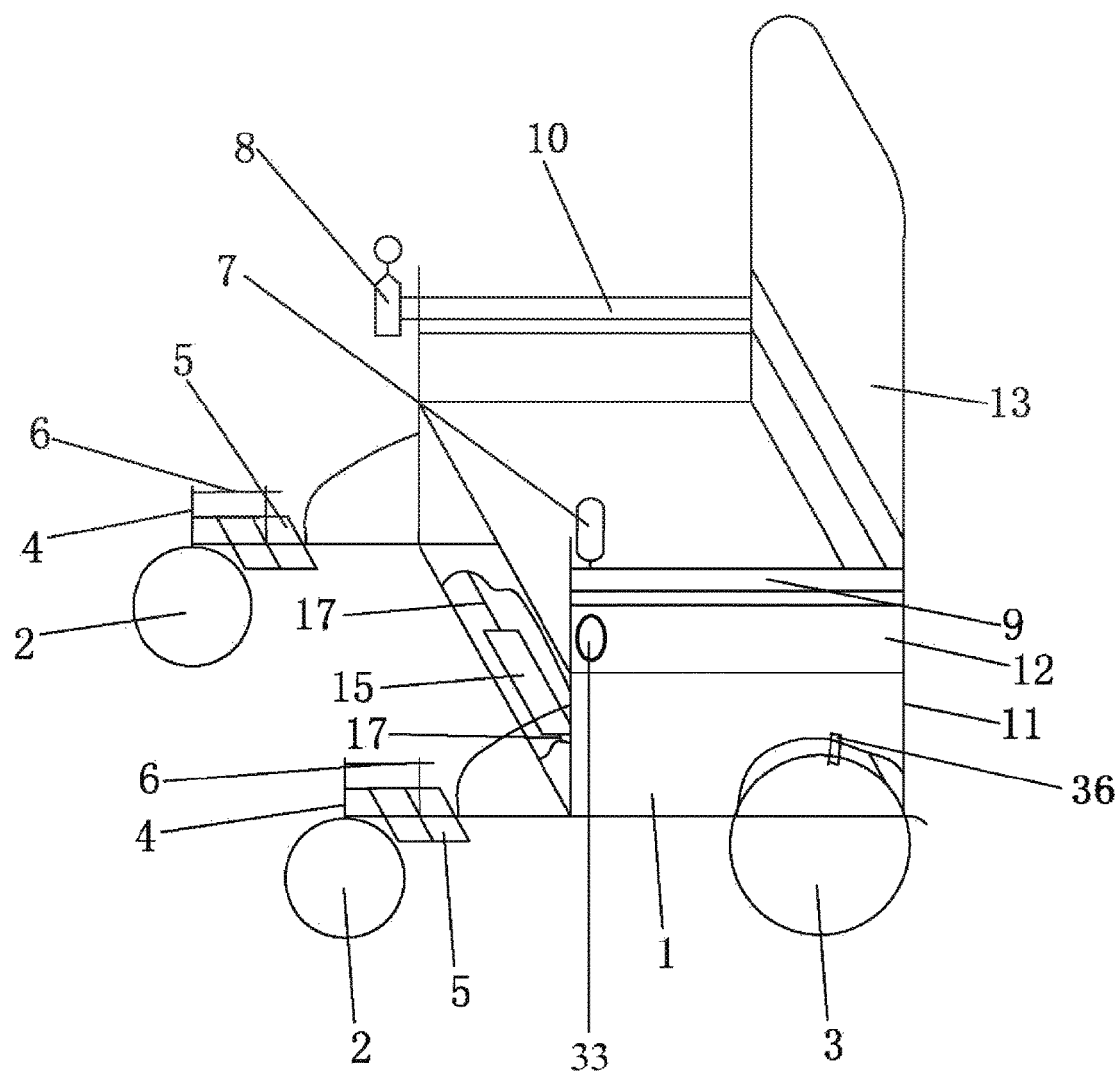
FIG. 1 is a structural schematic of a wheelchair provided by the present invention.

FIG. 1 shows a wheelchair provided by the present invention, comprising a wheelchair body 1, a control system, two front wheels 2, two rear wheels 3, a left and right transmission gear and a front and rear transmission gear. The two front wheels 2 and the left and right transmission gear are all mounted in the front part of the wheelchair body 1, and the two rear wheels 3 and the front and rear transmission gear are mounted in the rear part of the wheelchair body respectively. To be specific, in one embodiment, the two front wheels 2 are mounted in the front part of the wheelchair body 1 through spindles 4, and the two rear wheels 3 are mounted in the rear part of the wheelchair body 1 through a main bearing 23. The left and right transmission gear and the front and rear transmission gear are connected to the two front wheels 2, the two rear wheels 3 and the control system respectively, the left and right transmission gear is used to drive the two front wheels 2 to rotate left and right, and the front and rear transmission gear is used to drive the two rear wheels 3 to move forward and backward and assist left and right rotation. The wheelchair provided by the present invention can be easily manipulated. The left and right transmission gear and the front and rear transmission gear may enable the wheelchair to turn left or right by the control system while it moves on two parallel lines. Users may use the wheelchair without worry and can go to anywhere they want to go. The wheelchair provided by the present invention has reasonably designed dimensions and good appearance and completely tallies with ergonomics. Users may use or drive it in a safe, comfortable and easy way.

In one embodiment, the wheelchair body 1 comprises a frame 11, a rail 12 disposed on the frame1 11, and a backrest 13 connected to the frame 11 in a detachable manner. The backrest 13 is detachable and can be easily replaced and maintained and save cost. A left handrail 9 and a right handrail 10 are disposed on the rail 12. The frame 11, the rail 12 and the backrest 13 all are made of stainless steel and shaped as a framework, which can endure heavier weight and have high strength. Of course, the frame 11, the rail 12 and the backrest 13 can be made of other materials according to actual need other than stainless steel.

Preferably, the inner cores of the frame 11, the rail 12 and the backrest 13 are all made up of a combination of leather plus plastic net, or a combination of plastic net plus fine plastic net or plank inside the plastic net to enhance hardness.

In this embodiment, a direction controller 8 is disposed on the right handrail 10, and an audible caution light 33 is disposed on one side of the wheelchair body 1 and may be used under special circumstances, at night for example, playing a warning role.

Figure 2:
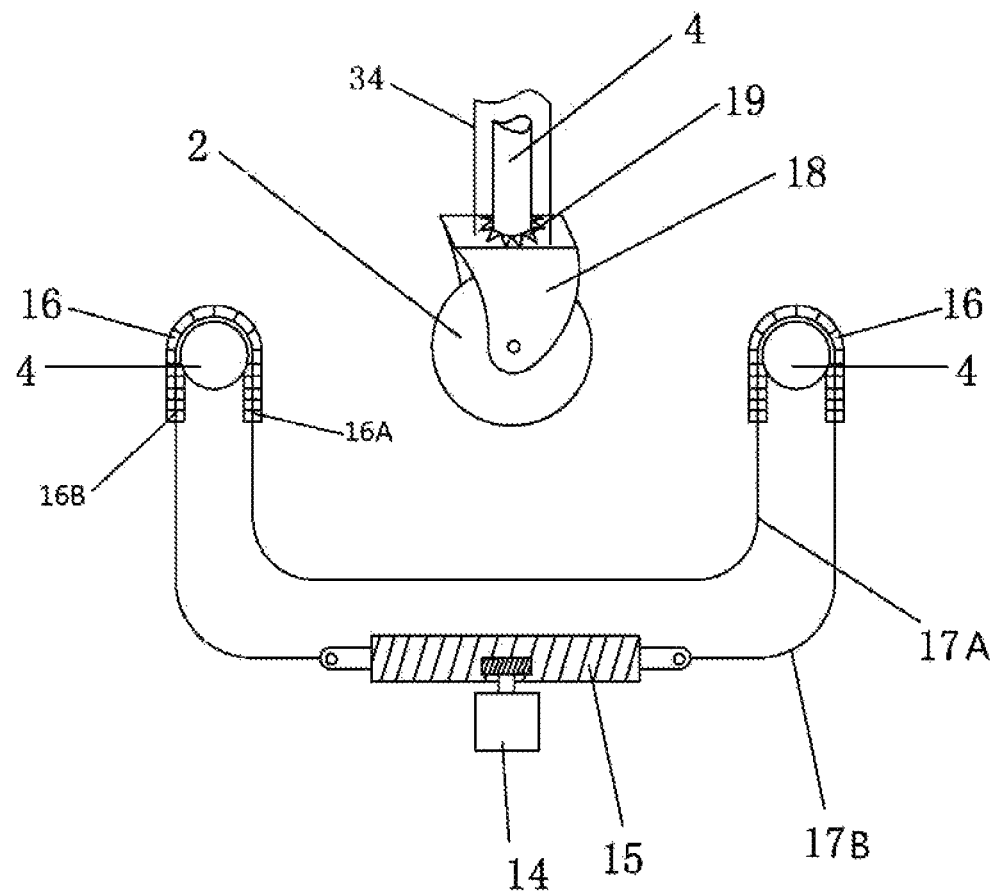
FIG. 2 is a structural schematic of a left and right transmission gear provided by the present invention.

As shown in FIG. 2, in this embodiment, the left and right transmission gear comprises a first motor 14 and a left and right movement member 15 mounted in the front end of the wheelchair body 1, and first chains 16a and 16b mounted on spindles 4 of the two front wheels 2. Preferably, the first motor 14 may be a 12V motor. Specifically, the spindle 4 of each of the two front wheels 2 is disposed in a housing 34 in a freely rotatable manner, and the housing 34 is connected to a bracket 6.

Figure 3:
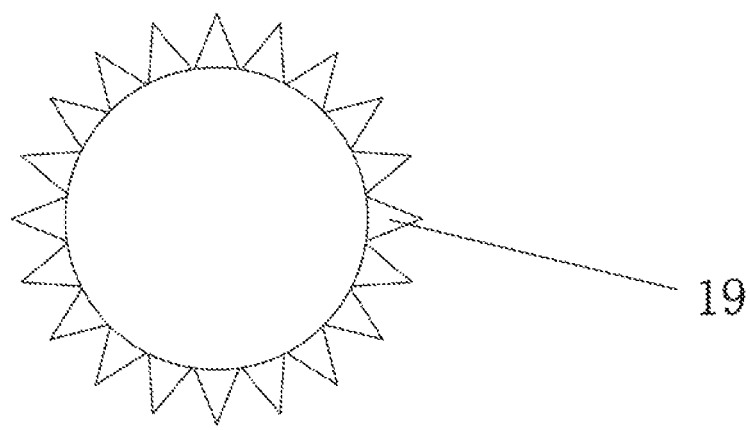
FIG. 3 is a planar structural schematic of a chain wheel shown in FIG. 2.

The bracket 6 is mounted on the front end of the wheelchair body 1, and the bracket 6 is preferably made of stainless steel, resulting in high strength of the bracket 6. The lower end of the spindle 4 of each of the two front wheels 2 is connected to an inverted U-shaped structure 18. In this embodiment, preferably, the lower end of the spindle 4 of each of the two front wheels 2 is connected to an inverted U-shaped structure 18 through a chain wheel 19. The structure of the chain wheel 19 is shown in FIG. 3. The inverted U-shaped structure 18 may rotate left and right relative to the spindle 4, and the left and right ends of the front wheel 2 are mounted on the inverted U-shaped structure 18 and may rotate on the inverted. U-shaped structure 18. The two chains 16a and 16b are both disposed in the chain wheels 19 in a sleeved manner. When the chains 16 move left and right, they drive the inverted U-shaped structures 18 to rotate left and right, by which the two front wheels 2 can be driven to rotate left and right.

One end of each of the two first chains 16a and 16b is mutually connected through a first metal wire 17a, while the other end of which is connected to the two ends of the left and right movement member 15 through a second metal wire. Preferably, the first and second metal wires are wire ropes. For better understanding, for example, as shown in FIG. 2, the two ends of the first chains 16a and 16b are named ends A and ends B respectively. Ends A of the two first chains are connected through the first metal wire 17a, and ends B of the two first chains are connected to the two ends of the left and right movement member 15 respectively through the second metal wire 17b. The connection through metal wires has high safety and a long service life and facilitates replacement. The left and right movement member 15 is connected to the first motor 14 that is connected to the control system. when the first motor 14 rotates, it drives the left and right movement member 15 to move left and right, then the left and right movement member 15 drives the two first chains 16*a* and 16*b* to move left and right by the first metal wire 17*a* and the second metal wire 17*b*, allowing that the two first chains drive the two front wheels 2 to rotate left and right.

Specifically, when the first motor 4 rotates and drives the left and right movement member 15 to move leftwards, the left and right movement member 15 drives the second metal wire 17*b* at its two ends to move leftwards, while the two first chains 16*a* and 16*b* move rightwards by the first metal wire 17*a* and the second metal wire 17*b*, the two first chains drive the inverted. U-shaped structures 18 to rotate rightwards while they move rightwards, and the inverted U-shaped structures 18 drive the two front wheels 2 to rotate rightwards; similarly, when the first motor 14 rotates and drives the left and right movement member 15 to move rightwards, the left and right movement member 15 drives the second metal wire 17*b* at its two ends to move rightwards, while the two first chains 16*a* and 16*b* move leftwards by the first metal wire 17*a* and the second metal wire 17*b*, the two first chains drive the inverted U-shaped structures 18 to rotate leftwards through the chain wheels 19 while they move leftwards, and the inverted. U-shaped structures 18 drive the two front wheels 2 to rotate leftwards, thereby realizing left and right rotation of the two front wheels 2.

Further, the left and right transmission gear further comprises a reduction gearbox mounted in the front end of the wheelchair body 1. The reduction gearbox is connected to the first motor 14. The reduction gearbox reduces speed in proportion, 100 at most for example. Reduction of rotation speed may prevent trip during rotation of the two front wheels 2, reduce vibration and facilitate direction change and manipulation, thereby allowing that the wheelchair can be satisfactory to users.

Figure 4:
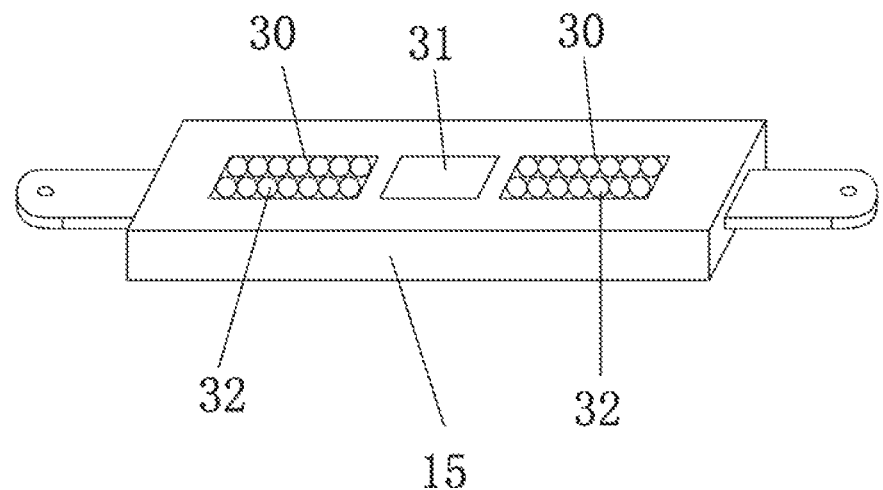
FIG. 4 is a structural schematic of the bottom of a left and right movement member shown in FIG. 2.

As shown in FIG. 4, in this embodiment, the left and right movement member 15 is a block. At least one ball groove 30 and an oil storage groove 31 for storing and releasing lubricating oil are disposed at the bottom of the Hock, and a cover is disposed on the oil storage groove 31. A plurality of rows of balls 32 is positioned in the ball groove 30, in which the balls 32 are partially extruded above the bottom surface of the block and contacted with the bottom plate of the wheelchair body 1. When the first motor 14 drives the block to move left and right, the balls 32 can smoothly move on the bottom plate of the wheelchair body 1, reducing the heat generated during movement of the block. Lubricating oil for lubricating the balls 32 is stored in the oil storage groove 31 and the oil storage groove 31 is positioned correspondingly to the movement locus of the balls 32.

In this embodiment, preferably, two ball grooves 30 are disposed side by side at the bottom of the block, two rows of balls 32 are disposed in each of the two ball grooves 30, and an oil storage groove 31 is disposed between two ball grooves 30 and may release lubricating oil to lubricate the balls 32 so that the balls 32 can rotate flexibly. It can be understandable that the number of the oil storage grooves 31 is not limited to one, and may be two for example, disposed at the two ends of the two ball grooves 30, or arranged alternately.

Figure 5:
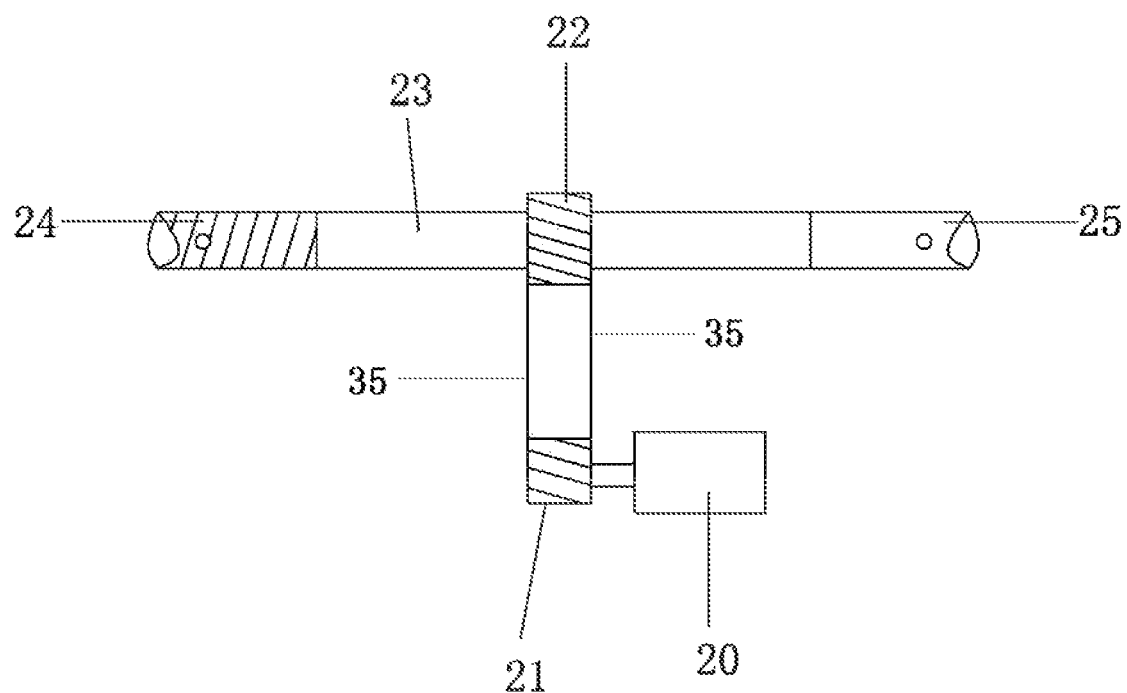
FIG. 5 is a structural schematic of a front and rear transmission gear provided by the present invention.

As shown in FIG. 5, the front and rear transmission gear comprises a second motor 20, a drive gear 21, a driven gear 22 and a main bearing 23 mounted in the rear end of the wheelchair body 1. Preferably, the second motor 20 may be a 48V motor. The second motor 20 is connected to the control system and the drive gear 21 respectively. The drive gear 21 is connected to the driven gear 22 through the second chains 35, the main bearing 23 is mounted on the driven gear 22, which has a threaded end 24 at one end, which is mounted in a bearing hole of one rear wheel 3 and connected to the bearing hole in a threaded manner, and a smooth end 25 at the other end, which is mounted in a bearing hole of the other rear wheel 3 and rotates freely inside the bearing hole. When the second motor 20 rotates, it drives the drive gear 21 to rotate, the drive gear 21 drives the driven gear 22 to rotate by the second chains 35, and the driven gear 22 drives the main bearing 23 to rotate; when the main bearing 23 rotates, the main bearing drives the rear wheel 3 on its threaded end 24 to move forward and backward and assists left and right rotation, and the rear wheel 3 on its smooth end 25 follows the rear wheel 3 on the threaded end 24 to move, thereby enabling the two rear wheels 3 to rotate left and right while moving forward and backward in parallel. As one end of the main bearing 23 is a threaded end 24 and the other end is a smooth end 25, the two rear wheels 3 may freely move forward and backward and assist left and right rotation. The wheelchair can turn left or right while it moves forward or backward on two parallel lines, thereby making breakthrough in the mechanical principle of existing wheelchairs, which cannot make a turn while moving forward and backward on two parallel lines, and making the use of the wheelchair more convenient. Users can go to anywhere they want to go.

For the sake of safety, brakes 36 may be disposed on the rear wheels 3 connected to the threaded end of the main bearing.

The first motor 14 and the second motor 20 provided by the present invention are mounted in the front end and back end of the wheelchair body 1 respectively and not exposed, so they are not liable to damage and rainwater wetting and have a long service life.

Figure 6:
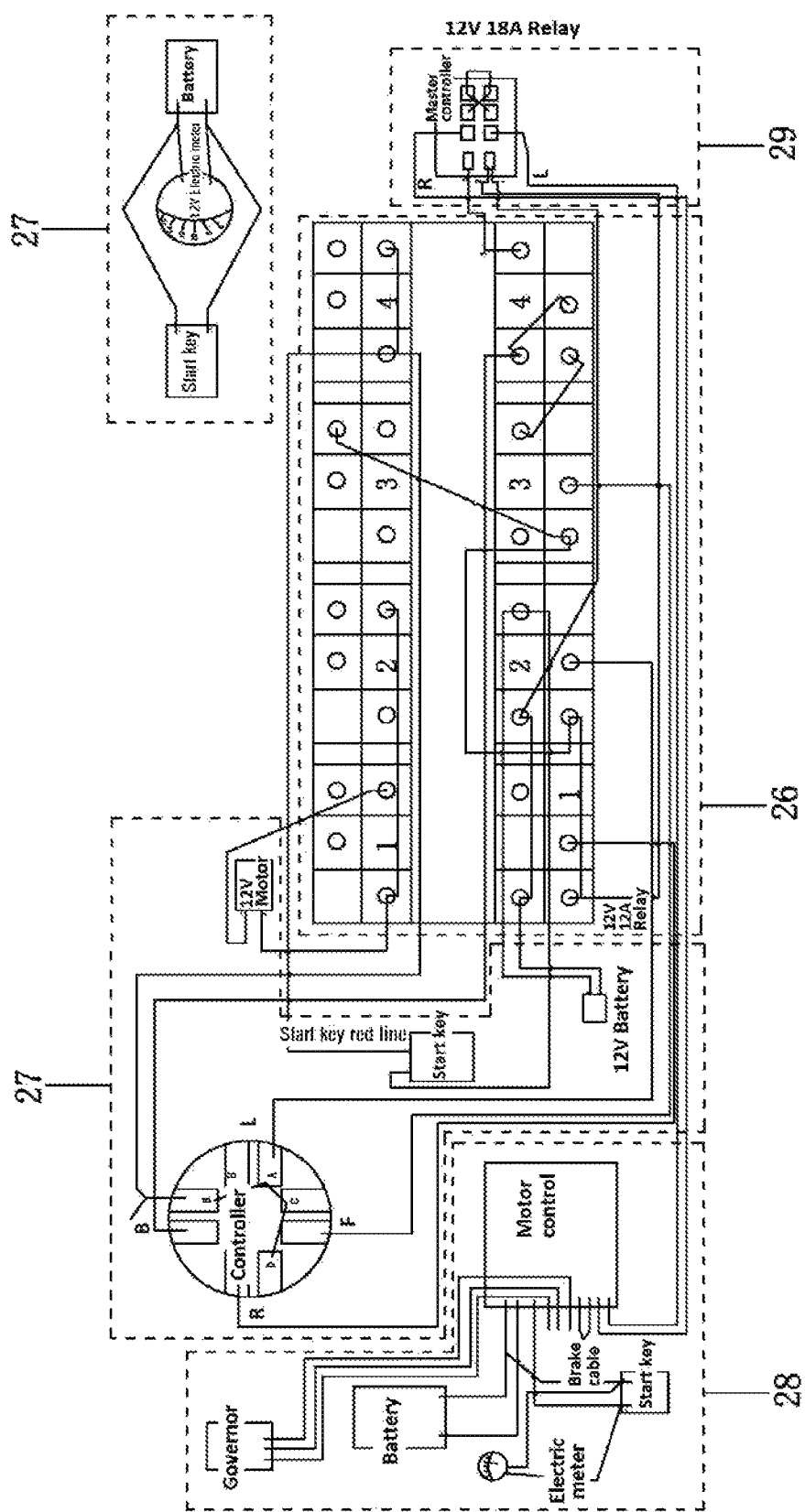
FIG. 6 is a schematic circuit diagram of a control system provided by the present invention.

As shown in FIG. 6, the control system comprises a master controller 29, a main circuit 26, a left and right transmission gear circuit 27 and a front and rear transmission gear circuit 28. The master controller 29, the left and right transmission gear circuit 27 and the front and rear transmission gear circuit 28 are all connected to the main circuit 26, and the front and rear transmission gear circuit 28 is connected to the master controller 29. The master controller 29 controls the forward and backward movement and left and right turn of the wheelchair, and controls the main powers of the wheelchair.

The left and right transmission gear circuit 27 mainly comprises a 12V first battery and four relays. The first battery is connected to the first motor 14 and the main circuit 26 respectively and outputs electric power to the first motor 14. Preferably, the first motor 14 and the first battery may adopt a 12V motor and a 12V battery. As shown in FIG. 6, the four relays are relay 1, relay 2, relay 3 and relay 4, which are (for example, 12V 12A low-voltage relays) are controlled by a large voltage relay (for example, 12V 18A relay), and the large voltage relay is used to handle possible failure of current load, thereby controlling the left and right rotation of the two front wheels 2.

The front and rear transmission gear circuit 28 is a box-type circuit comprising mainly comprises a second battery and a control box. The second battery is connected to the second motor 20 and the main circuit 26 respectively and outputs electric power to the second motor 20. Preferably, the second motor 20 and the second battery may adopt a 48V motor and a 48V battery. The control box is connected to the master controller 29 and the main circuit 26 respectively and controls the rotation of the second motor 20, thereby controlling the forward and backward movement of the two rear wheels 3 and assisting left and right rotation.

The master controller 29 mainly comprises a relay and integrates the main circuit 26, the left and right transmission gear circuit 27 and the front and rear transmission gear circuit 28 to form a control system. Preferably, the control system is a speed governor 7 mounted on a handrail on one side of the wheelchair body 1. The handrails include a left handrail 9 and a right handrail 10. As shown in FIG. 1, the speed governor 7 is mounted on the left handrail 9 of the wheelchair body 1 to make for manipulation of the user. The speed governor 7 may adjust speed to low speed, medium speed and full speed according to user's requirement, which can achieve a satisfactory effect to users.

The electric power of the foregoing first motor 14 and second motor 20 is outputted from for example, but not limited to: a 12V battery and a 48V battery. Relative to the wheelchair in the prior art, the wheel chair provided by the present invention has sufficient power supply and may effectively reduce the volume of batteries, which can be easily replaced. The left and right transmission gear circuit 27 and the front and rear transmission gear circuit 28 are separate, which can be not liable to circuit failure and allow for cost-efficient and easy maintenance of the wheelchair.

The wheelchair of the present invention has a simple structure, very convenient and practical operation and manipulation, which can be used safely and comfortably. The wheelchair also has a long-time service life, whose fittings in all parts can be easily replaced and repaired with low cost. It greatly meets market demand and has a very high value to market development.

The present invention is explained in detail by the above embodiments but they shall not be therefore understood as limitations to the scope of the present invention. It should be noted that for those skilled in the art, various changes and modifications may be made to the embodiments without departing from the spirit of the present invention, such as: combinations of different features of the embodiments. All these shall be in the protective scope of the present invention.

What is claimed is:

1. A wheelchair, comprising:
a wheelchair body;
a control system;
two front wheels and two rear wheels mounted to a front part and a rear part of the wheelchair body respectively;
wherein the wheelchair further comprises a left and right transmission gear used to drive the two front wheels to rotate left and right, and a front and rear transmission gear used to drive the two rear wheels to move forward and backward and assist left and right rotation, in which the left and right transmission gear is mounted to the front part of the wheelchair body, and the front and rear transmission gear is mounted to the rear part of the wheelchair body; and the left and right transmission gear is connected to the two front wheels, the two rear wheels and the control system, the front and rear transmission gear is connected to the two front wheels, the two rear wheels and the control system;
and wherein the left and right transmission gear comprises a first motor, a left and right movement member connected to the first motor which is connected to the control system, and two first chains mounted on spindles of the two front wheels, which are all mounted into a front end of the wheelchair body;
and wherein one end of each of the two first chains is mutually connected through a first metal wire, while the other end of each of the two first chains is connected to two ends of the left and right movement member through a second metal wire;
and wherein the first motor drives the left and right movement member to move left and right when it the first motor rotates, then the left and right movement member drives the two first chains on spindles of the wheels to move left and right by the first metal wire and the second metal wire and the two first chains drive the two front wheels to rotate left and right.

2. The wheelchair according to claim 1, wherein the front and rear transmission gear comprises a second motor, a drive gear, a driven gear and a main bearing, which are all mounted into a rear end of the wheelchair body;
and wherein the second motor is connected to the control system and the drive gear that is connected to the driven gear through second chains respectively, and the main bearing is mounted on the driven gear;
and wherein the second motor drives the drive gear to rotate when it the second motor rotates, then the drive gear drives the driven gear to rotate by the second chains, and the driven gear drives the main bearing to rotate, while the main bearing drives two rear wheels to move forward and backward and assists left and right rotation.

3. The wheelchair according to claim 1, wherein the front and rear transmission gear comprises a second motor, a drive gear, a driven gear and a main bearing, which are all mounted into a rear end of the wheelchair body;
and wherein the second motor is connected to the control system and the drive gear that is connected to the driven gear through second chains respectively, and the main bearing is mounted on the driven gear;
and wherein the second motor drives the drive gear to rotate when the second motor rotates, then the drive gear drives the driven gear to rotate by the second chains, and the driven gear drives the main bearing to rotate, while the main bearing drives two rear wheels to move forward and backward and assists left and right rotation.

4. The wheelchair according to claim 2, wherein the main bearing has a threaded end at one end which is mounted into a bearing hole of one rear wheel and connected to the bearing hole in a threaded manner, and a smooth end at the other end which is mounted into a bearing hole of the other rear wheel and rotating freely in the bearing hole;
and wherein the main bearing drives the rear wheel on its threaded end to move forward and backward and assists left and right rotation when the main bearing rotates, while the rear wheel on its smooth end follows the rear wheel on the threaded end to move.

5. The wheelchair according to claim 3, wherein the main bearing has a threaded end at one end which is mounted into a bearing hole of one rear wheel and connected to the bearing hole in a threaded manner, and a smooth end at the other end which is mounted into a bearing hole of the other rear wheel and rotating freely in the bearing hole;
and wherein the main bearing drives the rear wheel on its threaded end to move forward and backward and assists left and right rotation when the main bearing rotates, while the rear wheel on its smooth end follows the rear wheel on the threaded end to move.

6. The wheelchair according to claim 1, wherein the spindle of each of the two front wheels is disposed in a housing in a freely rotatable manner, in which the housing is connected to a bracket mounted on front end of the wheelchair body;

and wherein the lower end of the spindle of each of the two front wheels is connected to an inverted U-shaped structure, in which the inverted U-shaped structure is rotatable left and right relative to the spindle, and left and right ends of the front wheel are mounted on the U-shaped structure and rotatable on the U-shaped structure.

7. The wheelchair according to claim 6, wherein the lower end of the spindle of each of the two front wheels is connected to an inverted U-shaped structure through a chain wheel in which the first chains is disposed in a sleeved manner, so that the first chains are configured to drive the inverted U-shaped structures to rotate left and right when they move left and right, by which two front wheels are driven to rotate left and right.

8. The wheelchair according to claim 1, wherein the control system comprises a master controller, a main circuit, a left and right transmission gear circuit and a front and rear transmission gear circuit, in which the master controller, the left and right transmission gear circuit and the front and rear transmission gear circuit are all connected to the main circuit and the front and rear transmission gear circuit is connected to the master controller.

9. The wheelchair according to claim 8, wherein the control system is a speed governor mounted on a handrail on one side of the wheelchair body.

10. The wheelchair according to claim 1, wherein the left and right transmission gear further comprises a reduction gearbox mounted into the front end of the wheelchair body and connected to the first motor.

11. The wheelchair according to claim 1, wherein the left and right movement member is a block.

12. The wheelchair according to claim 11, wherein at least one ball groove in which a plurality of rows of balls is positioned and an oil storage groove for storing and releasing lubricating oil in which lubricating oil for lubricating balls is stored are disposed at bottom of the block;

and wherein the balls partially are extruded above bottom surface of the block and are contacted with a bottom plate of the wheelchair body so that they can move smoothly on the bottom plate of the wheelchair body;

and wherein the oil storage groove is positioned correspondingly to movement locus of the balls.

13. The wheelchair according to claim 12, wherein two rows of balls are positioned in the ball groove.

* * * * *